United States Patent [19]
Ayerst et al.

[11] Patent Number: 5,710,547
[45] Date of Patent: Jan. 20, 1998

[54] SELECTIVE CALL TRANSCEIVER AND METHOD OF RE-REGISTERING SAME

[75] Inventors: Douglas I. Ayerst, Delray Beach, Fla.; Robert Gary Goodman, Denton; James A. Starkweather, Grapevine, both of Tex.

[73] Assignee: Motorola, Inc., Schaumburg, Ill.

[21] Appl. No.: 569,813

[22] Filed: Dec. 8, 1995

[51] Int. Cl.⁶ .................................................. H04Q 1/00
[52] U.S. Cl. ................................. 340/825.44; 379/57
[58] Field of Search .................... 340/825.44; 455/38.1, 455/38.2; 379/57; 370/94.1, 434

[56] References Cited

U.S. PATENT DOCUMENTS 4,644,347  2/1987  Lucas et al.
4,845,491  7/1989  Fascenda .................. 340/825.44
5,321,813  6/1994  McMillen .................. 370/94.1
5,594,943  1/1997  Balachandran ............ 455/33.2

*Primary Examiner*—Brian Zimmerman
*Attorney, Agent, or Firm*—John H. Moore

[57] ABSTRACT

A method for re-establishing communication between a base station (102) that transmits on a forward channel, and a subscriber unit (108) that has temporarily lost the forward channel, uses the concept of a re-registration interval. The base station (102) transmits, to subscriber units (106, 108) in its area, a signal indicating the duration of a re-registration interval. A subscriber unit that has temporarily lost the forward channel determines whether the duration of such loss exceeds the re-registration interval. If the interval is exceeded, the subscriber unit sends a re-registration signal to the base station on a reverse channel. A selective call transceiver (400) is programmed to operate as a subscriber unit that uses the re-registration interval.

4 Claims, 3 Drawing Sheets

SELECTIVE CALL TRANSCEIVER AND METHOD OF RE-REGISTERING SAME

FIELD OF THE INVENTION

This invention is directed generally to the field of RF (Radio Frequency) communication, and more particularly to two-way RF communication between a base station and a subscriber unit such as a selective call transceiver.

BACKGROUND OF THE INVENTION

The coverage area of a conventional RF communication system is typically divided into zones and sub-zones in which a subscriber unit may be located. For efficient communication with a particular subscriber unit, the system needs to know where that unit is located. This permits communication to be established between a base station that is located in the same zone or sub-zone that the subscriber unit is located in.

To locate a given subscriber unit in one type of two-way communication system, the system may simulcast a WRU (where are you?) signal over a forward channel, asking the addressed subscriber unit to respond on a reverse channel. If the subscriber unit responds properly, base station receivers can determine where the responding unit is located by, for example, detecting an error-free response at a location within the coverage area. This allows the system to send a message to the subscriber unit via a transmitter that is located in close proximity to the subscriber unit.

As a subscriber unit moves from one zone or sub-zone to another, the subscriber unit typically registers with the system by transmitting registration information back to the base station receivers that are located in the subscriber unit's new zone or sub-zone. In a 2-way paging system, for example, a subscriber unit registers with the system via an ALOHA registration packet that the unit transmits on the reverse channel. By detecting the registration packet, the system knows where the subscriber unit is located and can address the subscriber unit in the zone or sub-zone where the unit is known to be located.

A problem arises when the subscriber unit experiences a loss of the forward channel signal. A subscriber unit may lose the forward channel signal when entering a tunnel, for example, and re-acquire the signal within the same zone or sub-zone after emerging from the tunnel. During the time of signal loss, the system may have tried (and failed) multiple times to locate the subscriber unit or to send a message to it. The system would then have an undelivered message intended for a subscriber unit of unknown location.

It is desired to solve the foregoing problem in a manner that avoids flooding the reverse channel with unnecessary attempts to re-register, but allows communication to be re-established with subscriber units that are truly lost.

DESCRIPTION OF THE PREFERRED EMBODIMENT

Figure 1:
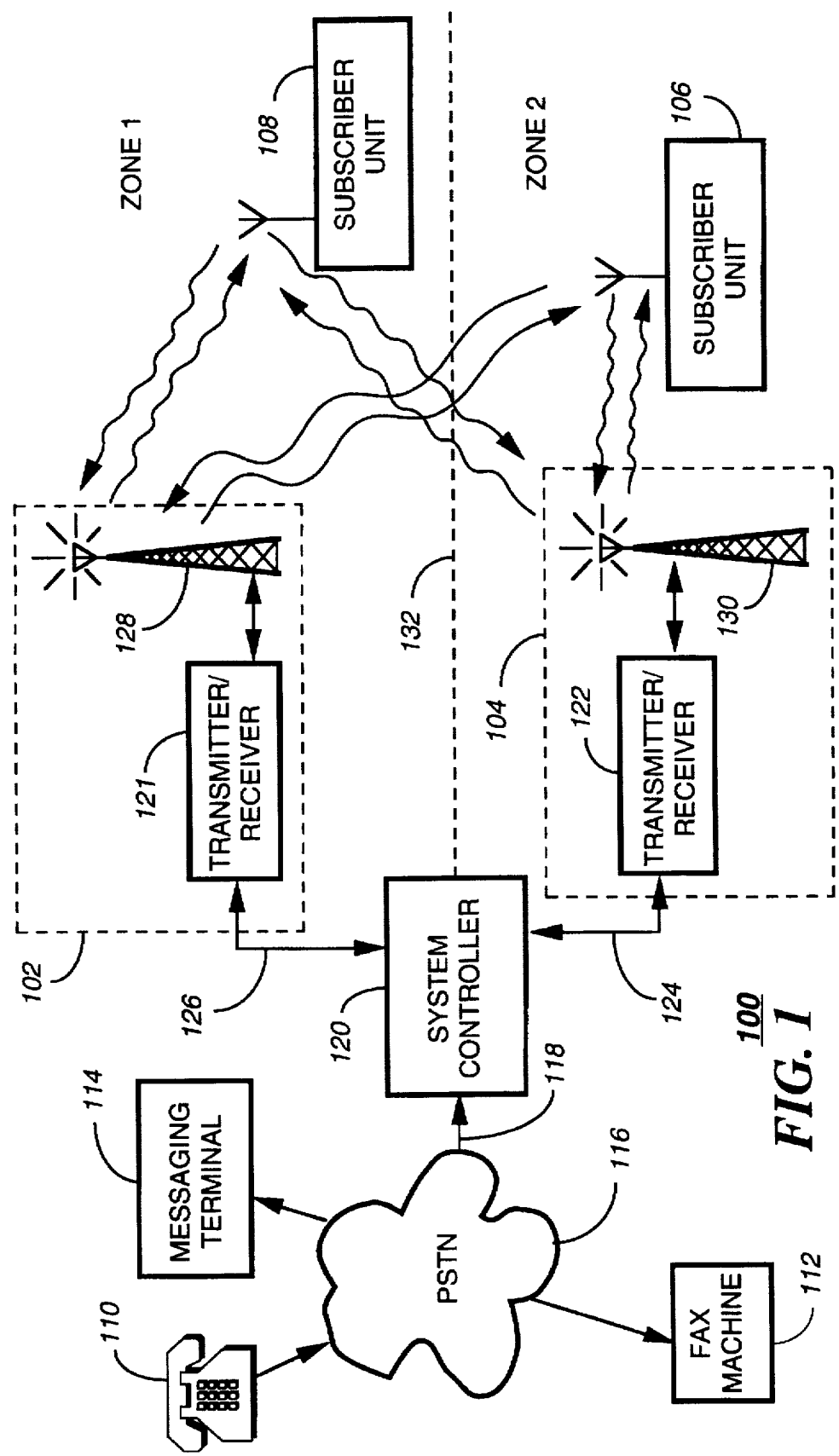
FIG. 1 is a block diagram of an RF communication system that operates in accordance with the invention.

Referring to FIG. 1, a communication system 100 is shown for transmitting information between base stations 102, 104 and subscriber units 106, 108. The illustrated system is a paging system for transmitting messages to selective call transceivers (subscriber units) that are subscribed to the paging system, but the invention is also useful with other forms of two-way communication systems.

The messages can originate from a conventional telephone 110, a facsimile machine 112 or a messaging terminal 114 connected through a conventional public telephone switch network (PTSN) 116 by conventional telephone links 118 to a system controller 120.

The system controller 120 oversees the operation of a plurality of radio frequency transmitter/receivers 121, 122 through one or more communication links 124, 126 which typically are twisted pair telephone wires or other forms of high quality audio communication links. The system controller 120 encodes and decodes inbound and outbound telephone addresses into formats that are compatible with land line message switch computers. The system controller also encodes and schedules outbound messages, which can include such information as analog voice messages and digital alphanumeric messages, for transmission by the transmitter/receivers 121, 122 to the subscriber units 106, 108 using antennas 128, 130. The system controller 120 decodes inbound messages, including unsolicited and response messages, received by the transmitter/receivers 121, 122 from the subscriber units.

Referring to the subscriber units 106,108, each of them (and all other subscriber units that are assigned to the illustrated communication system) has at least one unique address assigned to it. This unique address permits the transmission of a message only to the addressed subscriber unit.

The coverage area of a communication system is typically divided into zones, and possibly sub-zones. Such use of zones is illustrated in FIG. 1 wherein a line 132 shows the boundary between a zone 1 and a zone 2. The base station 102 and the subscriber unit 108 are located in zone 1; the base station 104 and the subscriber unit 106 are located in zone 2. Because the subscriber units are portable, they may move from zone to zone, or even out of the system's coverage area.

In operation, the base stations send information to the subscriber units on a forward channel using a synchronous frame structure, and the subscriber units send acknowledgment signals and other information to the base stations on a reverse channel. The signaling protocol for that type of two-way communication is described in U.S. application Ser. No. 08/498212, filed Jul. 5, 1995 and assigned to the assignee of this invention. The teachings of that Application are incorporated herein by reference. The following brief description of the signaling protocol will suffice for purposes of explaining the present invention.

The base stations 102, 104 transmit, in simulcast mode and on the forward channel, WRU (Where Are You?) inquiries that are addressed to subscriber units for which messages are waiting. A subscriber unit that receives a WRU inquiry automatically sends back, on the reverse channel, an acknowledgment that identifies the base station(s) whose WRU was received by the subscriber unit. That identified base station(s) then transmits the message to that subscriber unit. If a subscriber unit does not respond with an acknowledgment, the base station(s) waits for a period of time (the re-try interval) and re-sends the WRU. This cycle repeats a selected number of times until the intended subscriber unit acknowledges receipt of the WRU, receives its message, and acknowledges receipt of its message.

When a subscriber unit moves from one zone to another, it can detect that fact by determining which base station signal it is receiving. Upon determining that it has changed zones or sub-zones, it transmits an ALOHA registration packet (see the above-referenced Application for a description of ALOHA transmissions and registration packets) to the base station in the new zone.

As mentioned earlier, a problem occurs when a subscriber unit moves into an area where it can no longer receive its base station's signal on the forward channel. During the time that the forward channel signal is lost, the system may try unsuccessfully to locate the subscriber unit or to send a message to it. The system may then assume that the message is undeliverable, or it may continue trying, depending on the design of the system.

To overcome this problem according to the present invention, the base station transmitter is caused to transmit to the subscriber units in its territory a signal indicating the duration of a re-registration interval. This re-registration interval is the time of forward channel signal loss that must elapse before a subscriber unit should re-register in its zone. Thus, if a subscriber unit loses the forward channel signal at time T1 and re-acquires the forward channel signal at time T2, and if the duration T2-T1 exceeds the re-registration interval, then the subscriber unit should re-register with the system. (This assumes that the subscriber unit does not change zones while the forward channel signal was lost. A subscriber unit that changes zones should always re-register with the system in the new zone.) If the re-registration interval has not elapsed when a subscriber unit re-acquires the forward channel signal, then the subscriber unit should not re-register with the system.

Preferably, each subscriber unit stores, in its memory, an indication of the re-registration interval. It determines when the forward channel signal has become lost, and when it re-acquires the forward channel signal, it determines whether the forward channel signal was lost for a duration that exceeds the re-registration interval. Finally, the subscriber unit sends a re-registration signal to the base station if the re-registration interval was exceeded. The re-registration signal notifies the base station that the subscriber unit is still in the same zone or sub-zone, and is now capable of receiving information on the forward channel. The re-registration signal may be similar or identical to the above-referenced ALOHA registration packets.

Figures 2, 3:
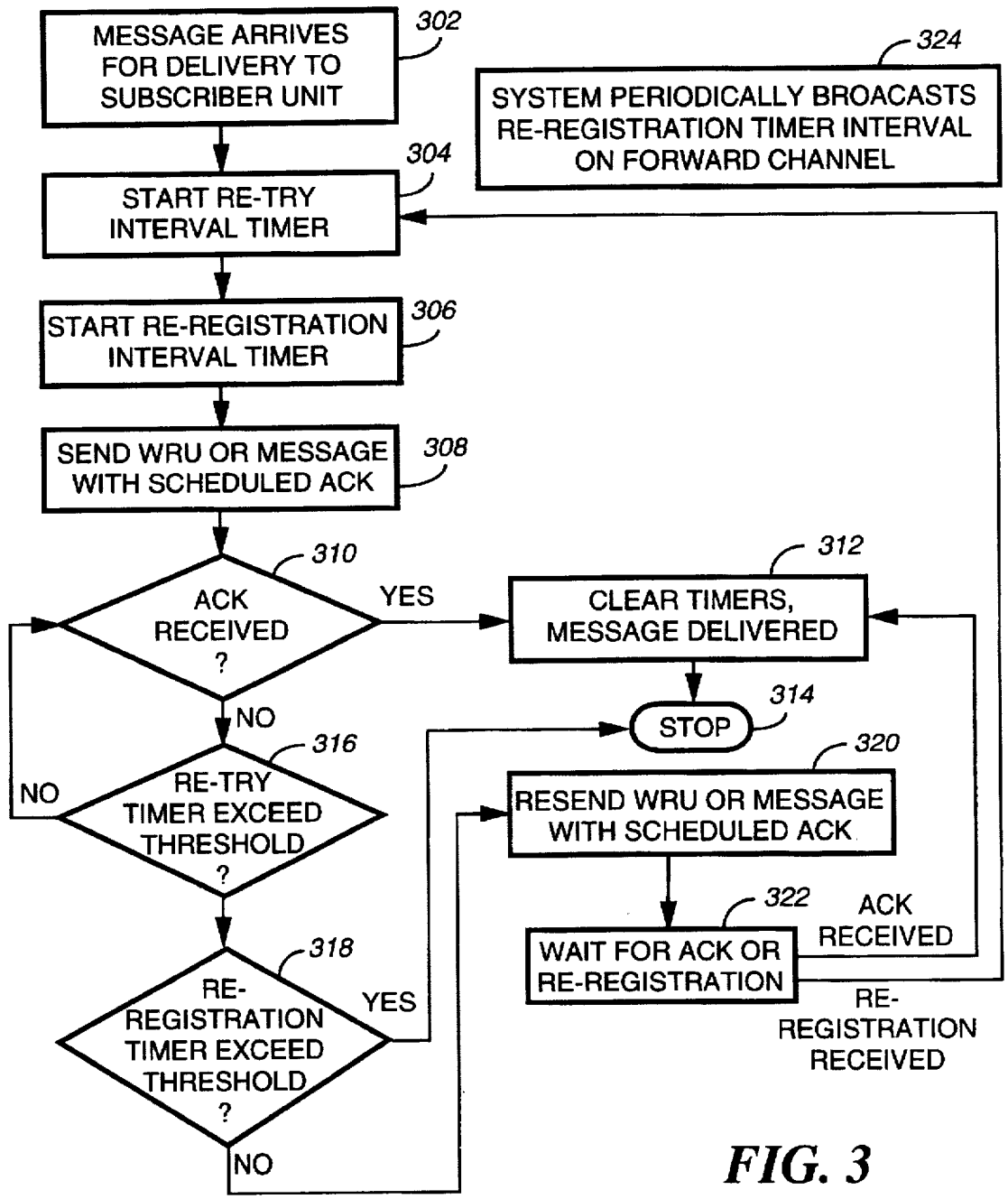
FIG. 2 illustrates a block information word that is sent from a base station transmitter of FIG. 1 to a subscriber unit to inform the subscriber unit as to the duration of a re-registration interval.
FIG. 3 is a flow chart showing how the system controller of FIG. 1 is programmed to operate in accordance with the invention.

In order for the system to inform the subscriber units of the re-registration time interval, the base stations transmit a block information word as shown in FIG. 2. This block information word 200 is used not only to alert the subscriber units as to the re-registration interval, but it also is used to indicate to the subscriber units the zone in which they are operating. Bit positions 6-12 are used to identify the zone in which the subscriber units are operating. Bit positions 13-17 are re-registration timer bits. That is, they indicate the length of the re-registration timer interval in cycles. If the forward channel signal is lost by a subscriber unit for more than this time period, the subscriber unit must re-register with the system.

Referring now to FIG. 3, a flow chart shows how the system controller 120 (FIG. 1) is programmed in order to operate in accordance with the invention. The process begins by a message arriving at the system controller 120 for delivery to a subscriber unit (step 302). The system controller then starts a re-try interval timer (step 304). The re-try interval is the time duration between successive attempts to send a WRU or a message, the receipt of which was not acknowledged.

At the next step 306, the system starts a re-registration interval timer. The re-registration interval, the time of forward channel signal loss that must elapse before a subscriber unit should send a re-registration signal, is a software variable that can be changed by an operator or manager of the communication system. Preferably, the re-registration interval is selected so that it is no shorter than the re-try interval. A typical re-try interval may be from about 30 seconds up to about 4 minutes; a re-registration interval may be 8 minutes or more. Both these variables are under the control of the system operator.

The program then proceeds to step 308 where it sends either a WRU or a message, depending on how far the system had gotten in attempting to locate and send a message to a particular subscriber unit. In either case, an acknowledgment is expected back from the addressed subscriber unit. At step 310, the system inquires as to whether an acknowledgment has been received in response to the information sent in step 308. If a response has been received, the program proceeds to step 312 for clearing the timers and then stopping per instruction 314.

If an acknowledgment was not received per step 310, the program proceeds to step 316 to determine whether the re-try timer has exceeded its threshold (i.e., whether the interval set in step 304 has been exceeded). If that interval has not been exceeded, the program loops back through steps 310 and 316, looking for an acknowledgment either to a WRU or to a transmitted message until the re-try timer interval has expired. When that occurs, the program proceeds from step 316 to step 318 to determine whether the re-registration timer has exceeded its threshold. That is, has the re-registration interval (set in step 306) been exceeded? If that interval has not been exceeded, the program proceeds to step 320 for re-sending the WRU or the message. The next step 322 causes the system to wait for an acknowledgment that the information sent in step 320 has been received, or for a re-registration packet from the addressed subscriber unit. If an acknowledgment is received, the program proceeds back to steps 312 and 314 to clear the timers and stop the process for this particular message. If no acknowledgment was received, but a re-registration packet was received, the program proceeds back to step 304 to start the entire process again because the re-registration packet indicates that the subscriber unit has re-acquired the forward channel and is in condition to receive its WRU or message.

Returning back to instruction 318, if the re-registration timer interval had been exceeded, the program would proceed from step 318 to step 314 to stop the process for this particular message. This means that the system has been unable to locate the subscriber unit for an interval that exceeds the re-registration time. It is assumed, therefore, that the message is at least temporarily undeliverable and the system does not try again until the subscriber unit sends a re-registration packet. In case the subscriber unit cannot be reached because it has moved to a different zone, then a message waiting to be sent by this particular system can be forwarded to a base station in the subscriber unit's new zone.

Referring to block 324, this indicates that the system periodically broadcasts the re-registration time interval on the forward channel. Such broadcasts would typically occur every one to four minutes. The block 324 is shown separately from the other steps because it does not fit into the sequence of the other steps shown in FIG. 3.

Figure 4:
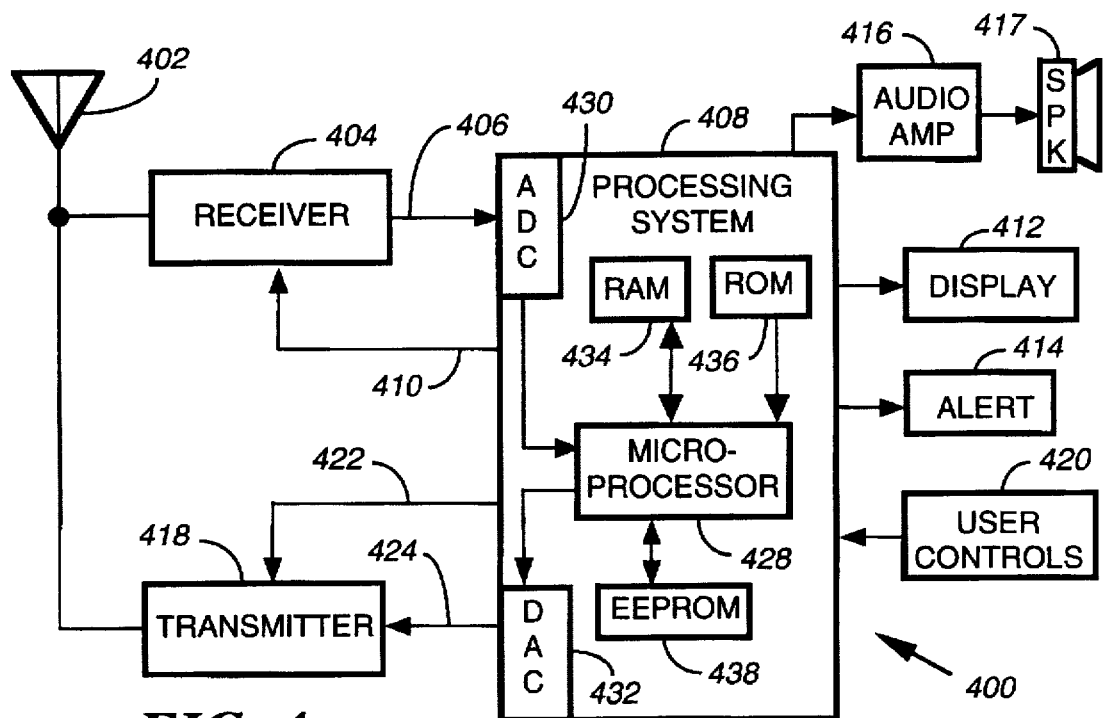
FIG. 4 is a block diagram of a selective call transceiver that operates in accordance with the invention.

Referring to FIG. 4, an electrical block diagram of a selective call transceiver 400 is shown which is programmed to operate in accordance with the invention. The selective call transceiver 400 includes an antenna 402 for intercepting and transmitting radio signals. The antenna 402 is coupled to conventional receiving circuitry (receiver 404) which filters the incoming signal to remove undesirable energy at off-channel frequencies, amplifies the filtered signal, frequency converts the signal, and demodulates it in a conventional manner to generate a demodulated signal on lead 406 which is coupled to a processing system 408. The receiver 404 also has a power control input 410 coupled to the processing system 408.

The processing system 408 is conventionally coupled to a display 412, to an alert 414, to an audio amplifier 416 which drives a speaker 417, to a transmitter 418, and to a set of user controls 420.

The transmitter 418 is coupled to the processing system 408 by a lead 422 that carries a demodulated signal, and by a lead 424 that carries a channel control signal. The output of the transmitter 418 is coupled to the antenna 402.

The processing system 408 includes a microprocessor 428 which is coupled to an analog-to-digital converter (ADC) 430, a digital-to-analog converter (DAC) 432, a random access memory (RAM) 434, a read only memory (ROM) 436, and an electrically erasable programmable read only memory (EEPROM) 438. The microprocessor 428 may be a model HC 11 made by Motorola, Inc.

Figure 5:
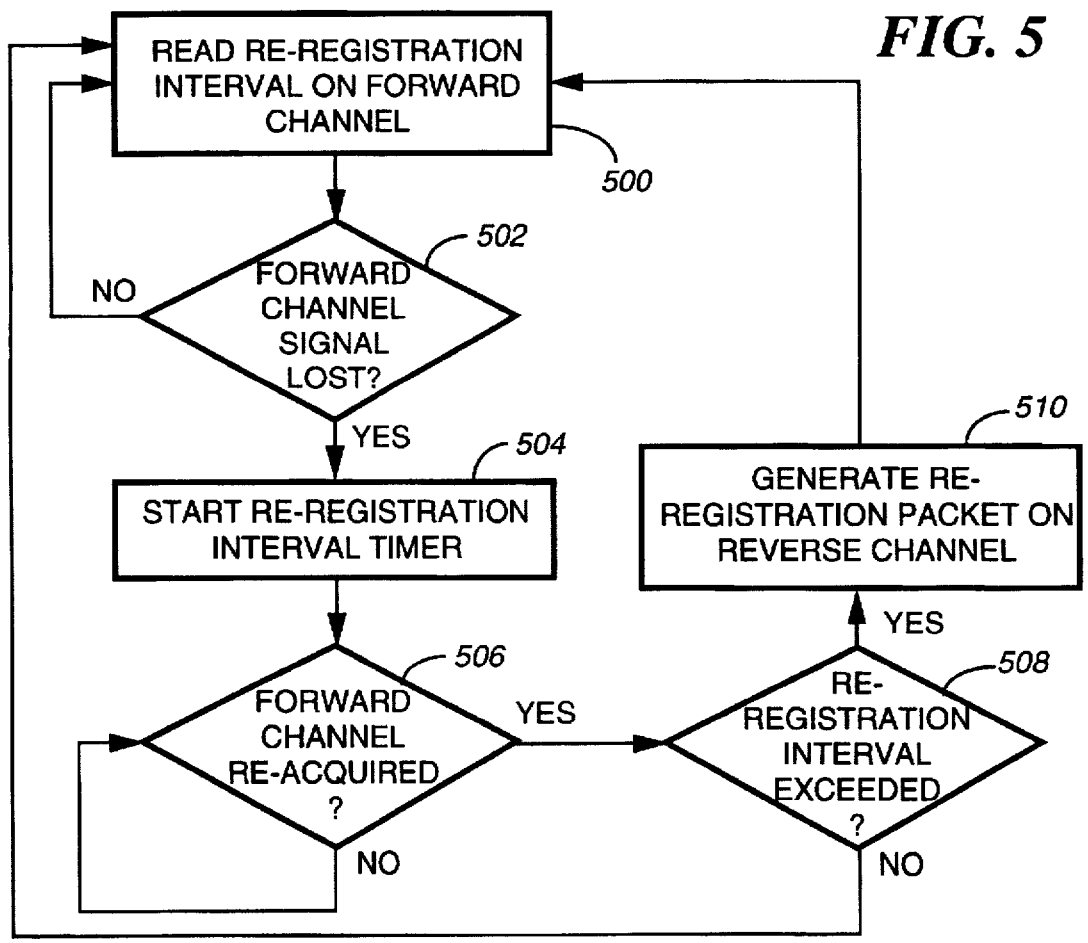
FIG. 5 is a flow chart showing how the subscriber unit's processor is preferably programmed in accordance with the invention.

The demodulated signal from the receiver 404 is coupled to the ADC 430 which converts the demodulated signal from an analog signal to a digital signal in a conventional manner for processing by the processing system 408. When the demodulation signal is an analog signal, the analog signal is converted to a digital signal using an analog-to-digital conversion technique such as adaptive differential pulse code modulation (ADPCM). A bit recovery function converts digital signals to binary data in a conventional manner. A synchronization function acquires and maintains bit, word, block, frame, and cycle synchronization with the outbound signaling protocol in a conventional manner. A further description of the specifics of the selective call transceiver 400 can be found in the above-referenced Application. Suffice it to say that the microprocessor 428 is programmed via instructions stored in the ROM 436 to operate in accordance with the invention. Information concerning the re-registration interval may be stored in the RAM 434, in the EEPROM 438, or in any other suitable form of memory. The way in which the microprocessor 428 is preferably programmed is shown in FIG. 5, to which reference is now made.

The illustrated program begins by the transceiver 400 reading the re-registration interval as transmitted on the forward channel (step 500). The re-registration interval is included in the block information word 200 (FIG. 2) transmitted by the subscriber unit's base station. In the next step 502, the transceiver 400 determines whether it has lost the forward channel signal. If the answer is no, the program loops back to step 500; if, however, the signal has been lost, the program proceeds to step 504 where the transceiver 400 starts a re-registration interval timer.

At the next step 506, the transceiver 400 determines whether the forward channel signal has been re-acquired. If the answer is no, the program continues executing step 506 to determine when the forward channel signal becomes re-acquired. When re-acquisition occurs, step 508 asks whether the re-registration interval has been exceeded. If it has not been exceeded, the program returns to step 500. Thus, the subscriber unit is preferably prohibited from sending a re-registration signal when the forward channel signal was lost for a duration that is shorter than the re-registration interval. This avoids filling the reverse channel with unnecessary re-registration requests.

Returning to step 508, if the re-registration interval has been exceeded, the program proceeds to step 510 for generating a re-registration packet which it transmits to the base station on the reverse channel. This tells the base station that the subscriber unit is now capable of receiving WRU's, messages, or other information on the forward channel.

Because the subscriber unit is capable of moving from zone to zone, the subscriber unit's processor is preferably programmed to determine whether the subscriber unit has changed zones during the time period between loss of the forward channel signal and subsequent acquisition thereof. If the subscriber unit has not changed zones, then the subscriber unit sends a re-registration signal as described above. If the subscriber unit has changed zones, then it sends an ALOHA registration packet to the base station in its new zone.

From the forgoing description, it will be appreciated that the invention provides improved and more reliable communication between base stations and subscriber units. When a subscriber unit has lost the forward channel for a period that exceeds the re-registration interval, the base station can safely stop sending WRU's and other messages to the subscriber unit. Thus, the base station can operate more efficiently. Further, because the subscriber units send re-registration signals only after the re-registration interval has been exceeded, the reverse channel is not undesirably filled with unnecessary re-registration requests. The result is a more efficient communication system.

Although the invention has been described in terms of a preferred embodiment, it will be obvious to those skilled in the art that many modifications and alterations may be made without departing from the invention. Accordingly it is intended that all such modifications and alterations be considered as within the spirit and scope of the invention as defined by the appended claims.

We claim:

1. In a communication system having a base station transmitter that transmits signals on a forward channel to subscriber units, and having a base station receiver that receives signals sent by subscriber units on a reverse channel, a method of re-establishing communication with a registered subscriber unit that has temporarily lost the forward channel signal, comprising:

a) transmitting to the registered subscriber unit, on the forward channel, information including a message and a re-registration interval;

b) upon failing to receive from the subscriber unit an acknowledgment that the message was received, determining whether the re-registration interval has been exceeded; and c) if the re-registration interval has not been exceeded, re-transmitting the message to the registered subscriber unit.

2. A method as set forth in claim 1 wherein the system has a re-try interval which sets a minimum time interval between successive attempts to send a message to the registered subscriber unit, and wherein the re-registration interval is longer than the re-try interval.

3. a method as set forth in claim 2 including not re-transmitting the message if the re-registration interval has been exceeded.

4. In a communication system having a base station transmitter that transmits signals on a forward channel to subscriber units, and having a base station receiver that receives signals sent by subscriber units on a reverse channel, a method of re-establishing communication with a registered subscriber unit that has temporarily lost the forward channel signal, comprising:

using the base station transmitter to transmit a message to the subscriber unit and a signal indicating the duration of a re-registration interval; in the subscriber unit:
storing an indication of the re-registration interval;
determining when the forward channel signal has become lost;
re-acquiring the forward channel signal and
determining whether the forward channel signal was lost for a duration that exceeds the re-registration interval; and
sending a re-registration signal to the base station receiver if the re-registration interval was exceeded, and wherein the subscriber unit can acknowledge receipt of the message, wherein if the base station receiver fails to receive an acknowledgment of receipt of the message, the base station transmitter re-sends the message after a re-try interval following the previous sending of the message, and wherein the re-registration interval is selected to be no shorter than the re-try interval.

* * * * *